Nov. 17, 1959   L. W. DYER ET AL   2,913,513
BUS DUCT FOR ELECTRICAL DISTRIBUTION SYSTEMS
Filed Dec. 24, 1953   2 Sheets-Sheet 2
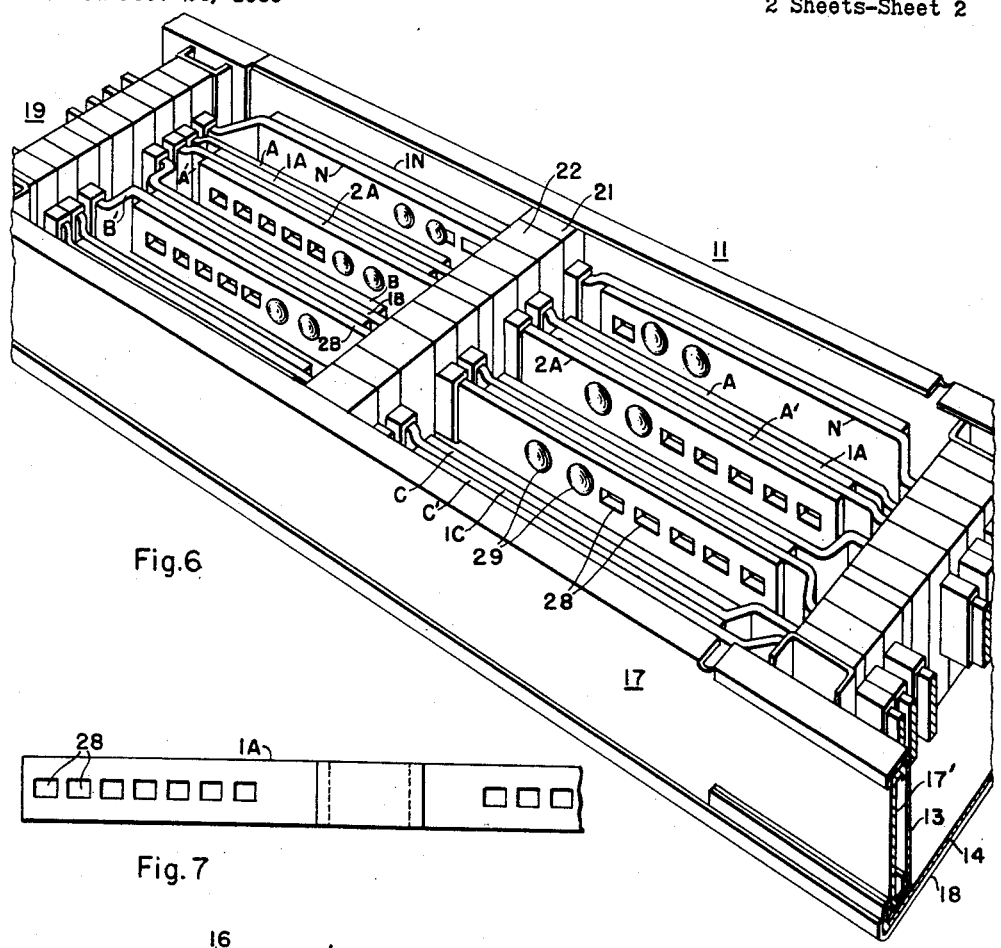
Fig. 6
Fig. 7
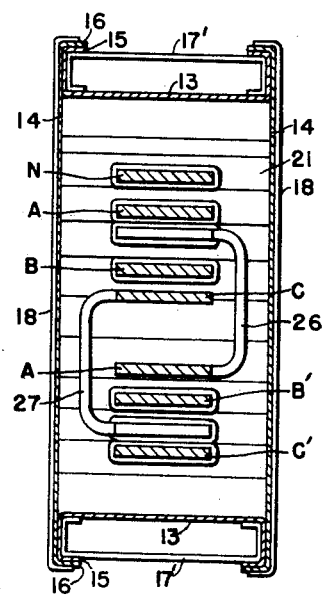
Fig. 4
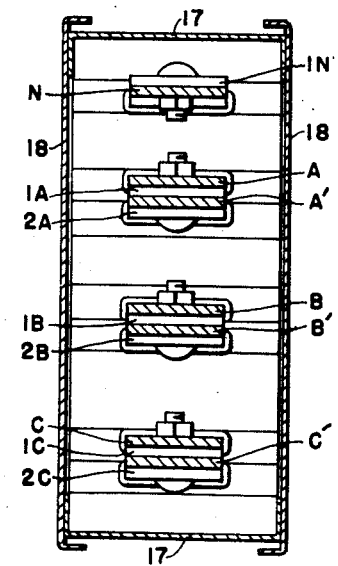
Fig. 5

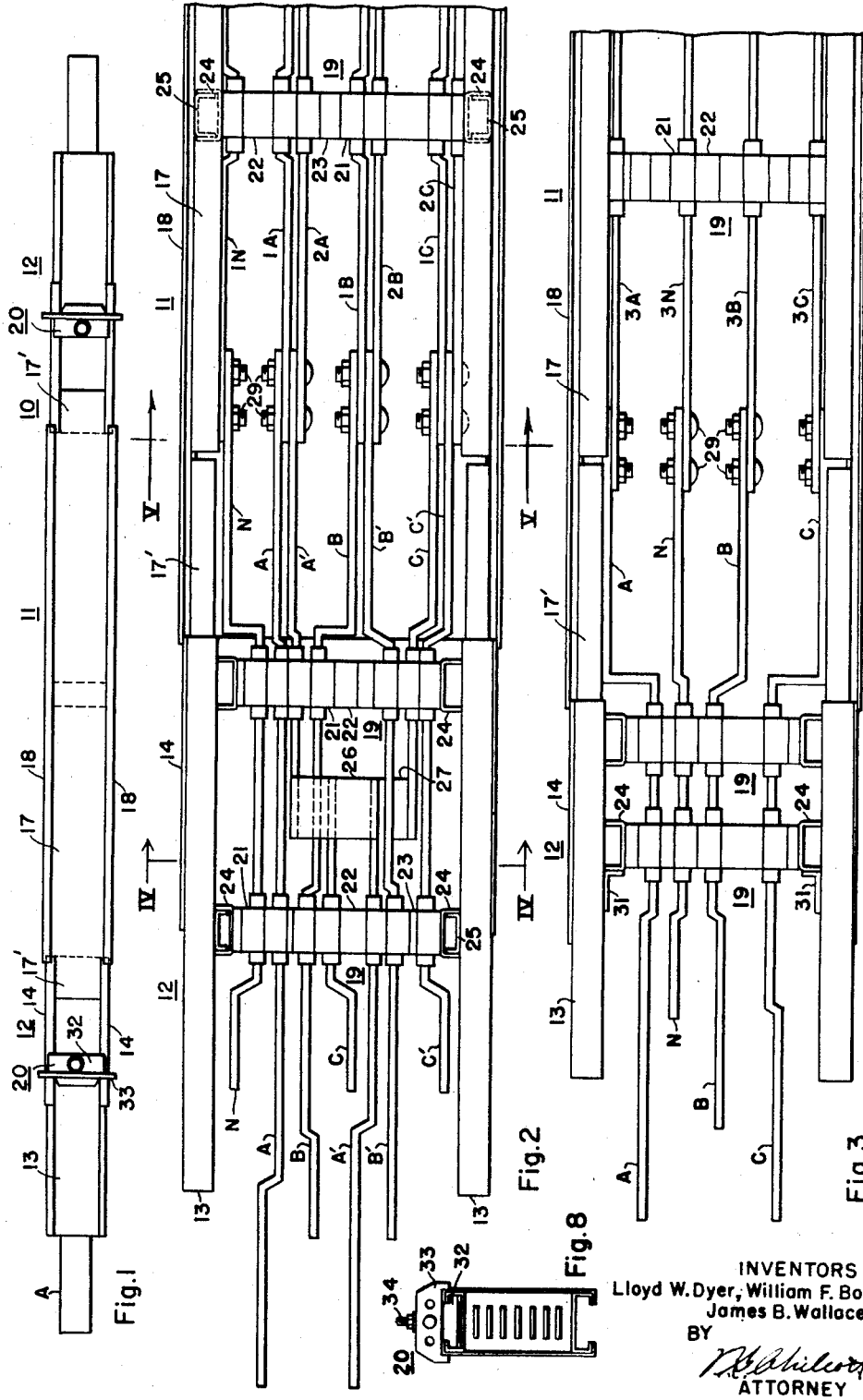

United States Patent Office 2,913,513
Patented Nov. 17, 1959

2,913,513

BUS DUCT FOR ELECTRICAL DISTRIBUTION SYSTEMS

Lloyd W. Dyer, William F. Born, and James B. Wallace, Beaver, Pa., assignors to Westinghouse Electric Corporation, East Pittsburgh, Pa., a corporation of Pennsylvania Application December 24, 1953, Serial No. 400,164

11 Claims. (Cl. 174—88)

Our invention relates, generally, to electrical distribution systems and, more particularly, to bus duct suitable for utilization in electrical distribution systems.

Heretofore, bus duct has been manufactured in standard sections of such lengths that by utilizing certain combinations of sections it is possible to install a bus run of any integral number of feet. However, the apparatus, such as switchgear and transformers, to which bus duct is connected is frequently so located that it requires a bus run which is not a full number of feet in length to make the installation. Thus, it has been necessary to enter special manufacturing orders to obtain the required length of bus duct. This results in a delay in the delivery of the bus duct since the switchgear and transformers must be exactly located before the accurate measurements can be obtained to lay out the bus duct system.

An object of our invention is to provide a bus duct section the overall length of which can be adjusted over a predetermined range.

Another object of our invention is to provide an adjustable bus duct section having a plurality of bus bars for each phase of a multi-phase system.

A further object of our invention is to provide for rigidly supporting the relatively movable portions of the bus bars in an adjustable bus duct section.

Still another object of our invention is to provide a low impedance bus duct having two or more sets of bus bars and which is adjustable by transposing the phase bus bars to bring all bars of the same phase together at the place where the adjustment is made.

A still further object of our invention is to provide a telescoping housing for an adjustable bus duct section.

An additional object is to make a bus duct section with an adjustable portion of greater internal width to provide room for making the adjustment without substantially increasing the overall external width of the duct.

Other objects of our invention will be explained fully hereinafter or will be apparent to those skilled in the art.

In accordance with one embodiment of our invention, the housing of a bus duct section telescopes near each end of the section and two adjustable joints are provided on the bus bars between the telescoping portions of the housing. Each joint provides half of the total adjustment available in the section. A series of openings are provided in the portions of the bus bars which overlap, and the bars for each phase are connected together by bolts disposed in aligned openings.

For a better understanding of the nature and objects of the invention, reference may be had to the following detailed description, taken in conjunction with the accompanying drawings, in which:

Figure 1 is a reduced view, in plan, of an adjustable bus duct section embodying the principal features of the invention;

Fig. 2 is a view, in side elevation, of a portion of the bus duct section shown in Fig. 1, one cover plate of the housing being removed;

Fig. 3 is a view, similar to Fig. 2, of a portion of a bus duct section of another type;

Fig. 4 is a view, in section, taken along the line IV—IV in Fig. 2;

Fig. 5 is a view, in section, taken along the line V—V in Fig. 2;

Fig. 6 is a view in perspective of the structure shown in Fig. 2, the adjustable bus bars and housing being retracted;

Fig. 7 is a view, in plan, of a portion of one of the bus bars utilized in the adjustable bus duct section, and Fig. 8 is a view, in end elevation, of the structure shown in Fig. 1.

Referring to the drawings, and particularly to Fig. 2, the bus duct structure shown therein is for use with bus duct of the low impedance type, such as described in Patent No. 2,653,991, issued September 29, 1953, to L. W. Dyer and W. F. Born, and assigned to the assignee of the present invention. The structure shown comprises a housing 10 having an intermediate portion 11 and two end portions 12 which telescope into the intermediate portion 11. Two sets of three-phase bus bars are disposed inside the housing 10. The corresponding phases of the two sets of bus bars are designated A, B, C and A', B', C'. A neutral bar N is also disposed inside the housing 10. It will be understood that the corresponding conductors for each phase may be connected in parallel-circuit relation. As described in the aforesaid patent, the bus bars in each set are spaced relatively closely together in order to reduce the overall impedance to a minimum amount.

As shown most clearly in Figs. 1, 2 and 4, each end portion of the housing 10 comprises two formed channels 13, one at the top and one at the bottom of the housing, and two side channels 14, one at the front and one at the rear of the housing. The top and bottom channels 13 have inturned flanges 15 which are overlapped by inturned flanges 16 on the side channels 14. One of the side channels may be spot welded to the channels 13 and the other side channel is preferably attached to the channels 13 by screws (not shown) thereby permitting the one channel to be removed to provide access to the inside of the housing. The channels 13 of the end portions face outwardly so that hangers 20 may be received therein for mounting the bus duct.

As shown most clearly in Figs. 1, 4, 5 and 6, the intermediate portion of the housing comprises top and bottom channels 17 and side channels 18. As explained hereinbefore, the end portions of the housing telescope with the intermediate portion. As shown, the side channels 14 of the end portions telescope into the side channels 18 of the intermediate portion and the top and bottom channels 17 of the intermediate portion have reduced end portions 17' which telescope into the channels 13. Thus, the length of the housing section 10 may be adjusted in accordance with the length of the bus bars which may also be adjusted, as will be explained more fully hereinafter. The top and bottom channels 17 of the intermediate portion have their open sides facing inwardly, rather than outwardly as do the channels 13 of the end portions, so that there is more width inside the duct for making the adjustable connections of the bus bars as described below.

As illustrated in Fig. 2, which shows one end portion and a little over one-half of the intermediate portion of the entire structure shown in Fig. 1, the phase bus bars are supported in the end portion in the manner fully described in the aforesaid Patent No. 2,653,991. The phase bus bars are supported and separated by a plurality of assemblies 19 each of which comprises insulating blocks 21, 22 and 23 which are preferably made from hard wood. Each of the blocks 21 is provided with a notch for receiving a bus bar. The blocks are assembled on the bus bars in contiguous relation and maintained under compression by tie bolts (not shown) which extend through the blocks into channels 24 disposed at the top and the bottom of the assembly. In this manner the bus bars are firmly clamped between the blocks. As shown in Fig. 2, channels 25, which are disposed inside the channels 24, are secured to the top and bottom channels 13 of the housing 10, thereby causing the phase bus bars to move with the end portions of the housing as they telescope into the intermediate portion.

As shown in Fig. 2, two sets of supporting blocks are provided in each end portion of the housing. It will be understood that the other end portion, which is not shown in Fig. 2, is similar in structure to the end portion which is illustrated.

As shown in Figs. 2 and 4, the phase bus bars, which enter the housing 10 in sequential phase relation, are transposed into grouped phase relation within the end portion of the housing. A generally U-shaped tie bar 26 is connected to two portions of the phase bar A' to transpose the bar A' adjacent to the phase bar A. Likewise, a tie bar 27 is connected to two portions of the phase bar C to transpose it adjacent to the phase bar C'. The phase bars B and B' are bent toward each other, thereby placing them in grouped phase relation. As explained hereinbefore, a similar transposition takes place in the other end portion of the structure.

As shown in Fig. 2, three sets of juxtaposed bus bars are disposed in and supported by the intermediate housing portion 11. Juxtaposed bars 1A and 2A are provided for phase A, juxtaposed bars 1B and 2B are provided for phase B and juxtaposed bars 1C and 2C are provided for phase C. A neutral bar 1N is also provided. The juxtaposed bars are supported by an assembly 19 of insulating blocks 21, 22 and 23' which are attached to channel members 24 in the manner previously described. Channel members 25 are disposed inside the channel members 24 and attached to the intermediate portion of the housing, thereby fixing the juxtaposed bars in the intermediate portion of the housing.

As shown in Figs. 6 and 7, each one of the juxtaposed bars is provided with a plurality of longitudinally spaced openings 28. The ends of the phase bus bars which overlap the juxtaposed bars are also provided with similarly spaced openings which may be aligned with corresponding openings in the juxtaposed bars to permit bolts 29 to be inserted through the openings to secure the bus bars together. While we prefer use of the spaced openings 28, it is obvious that elongated openings or slots could be used, or clamps around the overlapping end portions of the bars could be used to give a good electrical connection. As shown in Fig. 2, in which the adjustable housing section is extended to its full length, relatively short portions of the bus bars overlap each other. As shown in Fig. 6, in which the housing section is fully retracted, relatively long portions of the bus bars overlap. Since both ends of the juxtaposed bars are overlapped by portions of the phase bus bars, the overall adjustment obtainable is twice the adjustment provided in each end. Thus, by way of example, six inches of variation in length may be obtained at each end, thereby providing 12 inches total variation.

The outer bus bars at the top and bottom of the intermediate section, where the adjustment is made, are bent outwardly to give sufficient room for the bolts 29 to be inserted in the holes 28 and to give more working space for the use of a wrench in tightening the bolts. This is possible without sacrificing the required electrical spacing between the outer bus bars and the metal housing because the channels 17 of the intermediate portion 11 face inwardly rather than outwardly, as do the channels 13 of the rest of the duct. Thus, the duct has greater internal width at the adjustable intermediate portion without substantially increasing the overall extreme width.

As shown most clearly in Fig. 8, each hanger 20 is so constructed that its position on the duct may be shifted, thereby permitting the desired adjustment in the length of the adjustable bus duct section to be made readily. Each hanger comprises a supporting plate 32 which fits into the top channel 13 at any point along the channel and a clamping plate 33 which spans the side channels 14 and is attached to the plate 32 to secure it at the desired position. A drop rod 34 is attached to the supporting plate 32.

The adjustable bus duct structure shown in Fig. 3 differs from that shown in Fig. 2 primarily in that only one bus bar per phase is utilized instead of two bars per phase as shown in Fig. 2. The phase bus bars A, B, C and a neutral bar N are supported in the end portions 12 of the housing by means of block assemblies 19 in the manner previously described. As shown in Fig. 3, the channel members 24 of the block assemblies 19 are secured to the channels 13 by angle members 31.

Bus bars 3A, 3B, 3C and 3N are disposed in the intermediate portion 11 of the housing and are supported by block assemblies 19 similar to those previously described. The bars 3A, 3B, 3C and 3N are fixed in the intermediate portion 11 of the housing by the supporting block assembly 19.

The phase bus bars overlap the ends of the corresponding bars 3A, 3B, 3C and 3N and are secured to these bars by means of bolts 29 which are inserted in aligned openings 28 in the manner previously described. Thus, a predetermined amount of variation in length is obtained at each splice of the bus bars, it being understood that the other end portion of the structure is similar to the portion shown in Fig. 3. Accordingly, the total variation in length obtainable is twice the variation provided at one end of the structure. The adjustable bus duct section shown in Fig. 3 may be utilized with bus duct of the plug-in type, in which plug-in switch units may be attached to the housing at predetermined intervals for the purpose of supplying power to power consuming apparatus, as shown, for example, in Born and Langaunet Patent No. 2,641,636 issued June 9, 1953.

From the foregoing description, it is apparent that we have provided a bus duct section which may be adjusted in the field to predetermined lengths of fractions of a foot. By utilizing the present adjustable section with other sections of standard lengths, it is possible to obtain overall lengths of any desired amount without it being necessary to manufacture special lengths of other than a number of full feet. Accordingly, it is no longer necessary to wait for the switchboards and transformers to which the bus duct is connected to be placed in position to get accurate measurements prior to laying out the bus duct installation for a power distribution system, since a few inches variation in length can be taken care of by utilizing the present adjustable bus duct section. Therefore delays in manufacturing and delivering the bus duct can be avoided. Furthermore, the cost of manufacturing the duct is reduced since it is no longer necessary to enter manufacturing orders for special lengths of duct.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a multi-phase bus duct, in combination, a housing section having an intermediate portion and two end portions which telescope with the intermediate portion, a plurality of sets of phase bus bars in each end portion of the housing section, each set containing at least one bus bar for each phase, the bus bars in each set being disposed in sequential phase relation, a plurality of juxtaposed bars for each phase disposed in and supported by the intermediate portion of the housing section, tie bars transposing the phase bars from sequential phase relation into grouped phase relation, said grouped phase bars and said juxtaposed bars having overlapping portions, and fastening means securing the overlapping portions of said bus bars together.

2. In a multi-phase bus duct, in combination, a housing section having an intermediate portion and two end portions which telescope with the intermediate portion, two sets of phase bus bars in each end portion of the housing section, each set containing one bus bar for each phase, said phase bars being in sequential phase relation, a plurality of juxtaposed bars for each phase disposed in and supported by the intermediate portion of the housing section, tie bars transposing sequential phase bars into grouped phase relation, said grouped phase bars and said juxtaposed bars having overlapping portions, a plurality of alignable openings in said grouped phase bars and said juxtaposed bars, and fastening means disposed in aligned openings to secure the overlapping portions of the bus bars together.

3. In a multi-phase bus duct, in combination, a housing section having an intermediate portion and two end portions which telescope with the intermediate portion, a plurality of sets of phase bus bars supported by and movable with each end portion of the housing section, each set containing at least one bus bar for each phase, said phase bars being in sequential phase relation, a plurality of juxtaposed bars for each phase disposed in and supported by the intermediate portion of the housing section, tie bars transposing sequential phase bars into grouped phase relation, said grouped phase bars overlapping portions of corresponding juxtaposed bars, and fastening means securing the overlapping portions of said bus bars together.

4. In a multi-phase bus duct, in combination, a housing section having an intermediate portion and two end portions which telescope with the intermediate portion, a plurality of sets of phase bus bars supported by and movable with each end portion of the housing section, each set containing one bus bar for each phase, said phase bars being in sequential phase relation, a pair of juxtaposed bars for each phase disposed in and supported by the intermediate portion of the housing section, generally U-shaped tie bars in each end portion of the housing for transposing sequential phase bars into grouped phase relation, said grouped phase bars overlapping variable portions of corresponding juxtaposed bars, the overlapping portions of said bars having aligned openings therein, and fastening means disposed in said openings for securing the bars together.

5. In a bus duct structure, in combination, a housing having an intermediate portion and two end portions which telescope with the intermediate portion, each end portion comprising oppositely disposed top and bottom channels having their open sides facing outwardly and two side members fastened to the top and bottom channels, said intermediate portion comprising oppositely disposed top and bottom channels having their open sides facing inwardly and side members fastened to the top and bottom channels of the intermediate portion, bus bars disposed in each end portion, and overlapping bus bars disposed in said intermediate portion to overlap portions of the bars in the end portions of the housing, the overlapping portions of the outer bus bars being offset outwardly in the intermediate widened portion of the housing provided by said inwardly facing channels.

6. In a bus duct structure, in combination, a housing having an intermediate portion and two end portions which telescope with the intermediate portion, each end portion comprising oppositely disposed top and bottom channels having their open sides facing outwardly and two side members fastened to the top and bottom channels, said intermediate portion comprising oppositely disposed top and bottom channels having their open sides facing inwardly and side members fastened to the top and bottom channels of the intermediate portion, bus bars disposed in each end portion, overlapping bus bars disposed in said intermediate portion to overlap portions of the bars in the end portions of the housing, said top and bottom channels of the intermediate portion having reduced ends which telescope into the top and bottom channels of the end portions of the housing, and the overlapping portions of the outer bus bars being offset outwardly in the intermediate widened portion of the housing provided by said inwardly facing channels.

7. In a bus duct structure, in combination, a housing having an intermediate portion and two end portions which telescope with the intermediate portion, each end portion comprising oppositely disposed top and bottom channels having their open sides facing outwardly and two side channels which overlap the top and bottom channels, said intermediate portion comprising oppositely disposed top and bottom channels having their open sides facing inwardly and side channels which overlap the top and bottom channels of the intermediate portion, bus bars disposed in each end portion, overlapping bus bars disposed in said intermediate portion to overlap portions of the bars in the end portions of the housing, and detachable hangers having portions slidably disposed in the outwardly facing channels of the end portions of the housing for supporting the structure.

8. In a bus duct structure, in combination, a housing having an intermediate portion and two end portions which telescope with the intermediate portion, each end portion comprising oppositely disposed top and bottom channels having their open sides facing outwardly and two side members fastened to the top and bottom channels, said intermediate portion comprising oppositely disposed top and bottom channels having their open sides facing inwardly and side members fastened to the top and bottom channels of the intermediate portion, bus bars in said intermediate and end portions, said bus bars having overlapping end portions in said intermediate portion, and the outer of said bus bars being offset outwardly in the intermediate widened portion provided by the said inwardly facing channels.

9. In a multi-phase bus duct, in combination, an elongated housing having portions movable longitudinally in telescopic relation, a plurality of relatively closely spaced phase bus bars having ends disposed within the housing, a plurality of connecting bars for joining ends of corresponding phase bars, said connecting bars being spaced differently from the phase bars, connecting means for transposing phase bars to overlap connecting bars of the corresponding phase, fastening means for securing overlapping portions of said bars together, and insulating means for maintaining said connecting bars for different phases in spaced relation.

10. In a multi-phase bus duct, in combination, an elongated housing having portions movable longitudinally in telescopic relation, a plurality of relatively closely spaced phase bus bars having ends disposed within the housing, a plurality of connecting bars for joining ends of corresponding phase bars, the distance between connecting bars for different phases being greater than the distance between phase bars, connecting means for transposing phase bars to overlap connecting bars of the corresponding phase, fastening means for securing overlapping portions of said bars together, and spacing means disposed between connecting bars of different phases.

11. In a multi-phase bus duct, in combination, a housing having an intermediate portion and two end portions which telescope with the intermediate portion, a plurality of intermediate bus bars for each phase disposed within the intermediate portion, each of said bus bars having a plurality of longitudinally spaced openings therein, corresponding phase bus bars supported by and movable with each end portion of the housing, the intermediate bus bars being spaced differently from the bus bars in the end portions, connecting means for transposing bars of the end portions to overlap ends of corresponding phase bars of the intermediate portion, said bars of the end portions having spaced openings therein alignable with the openings in the bars of the intermediate portion, fastening means disposed in the spaced aligned openings for securing the overlapping portions of said bus bars together, and insulating means for maintaining the intermediate bars for different phases in spaced relation.

References Cited in the file of this patent

UNITED STATES PATENTS

| | | |
|---|---|---|
| 1,967,340 | Van Splunter | July 24, 1934 |
| 2,045,942 | Brody | June 30, 1936 |
| 2,050,318 | Henry | Aug. 11, 1936 |
| 2,261,857 | Novak et al. | Nov. 4, 1941 |
| 2,274,422 | Mahoney et al. | Feb. 24, 1942 |
| 2,287,502 | Togesen et al. | June 23, 1942 |
| 2,407,142 | Cole et al. | Sept. 3, 1946 |
| 2,638,188 | Corn | May 12, 1953 |
| 2,653,991 | Dyer et al. | Sept. 29, 1953 |
| 2,798,898 | Popovich et al. | July 9, 1957 |

FOREIGN PATENTS

| | | |
|---|---|---|
| 660,919 | Great Britain | Nov. 14, 1951 |